US012199987B2

(12) United States Patent
Mantin et al.

(10) Patent No.: US 12,199,987 B2
(45) Date of Patent: Jan. 14, 2025

(54) WEB-AUTHORIZATION USING ENHANCED COOKIE

(71) Applicant: Intuit Inc., Mountain View, CA (US)

(72) Inventors: Itsik Yizhak Mantin, Hod HaSharon (IL); Yaron Sheffer, Hod HaSharon (IL); Keren Simchon, Hod HaSharon (IL); Gal Cohen, Hod HaSharon (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/102,074

(22) Filed: Jan. 26, 2023

(65) Prior Publication Data
US 2024/0259377 A1    Aug. 1, 2024

(51) Int. Cl.
H04L 9/40    (2022.01)

(52) U.S. Cl.
CPC .......... H04L 63/101 (2013.01); H04L 63/083 (2013.01); H04L 63/1433 (2013.01)

(58) Field of Classification Search
CPC . H04L 63/101; H04L 63/083; H04L 63/1433; H04L 63/08; G06F 21/6263; G06F 2221/2103; G06F 21/31
See application file for complete search history.

(56) References Cited

U.S. PATENT DOCUMENTS

| | | | | |
|---|---|---|---|---|
| 7,908,649 | B1* | 3/2011 | Arora | H04L 67/568 |
| | | | | 726/7 |
| 8,874,899 | B1* | 10/2014 | Persson | G06F 21/128 |
| | | | | 713/155 |
| 10,063,549 | B1* | 8/2018 | Dotan | H04L 63/0838 |
| 10,250,629 | B2* | 4/2019 | Thompson | H04L 63/1466 |
| 2003/0018901 | A1* | 1/2003 | Burritt | H04L 63/08 |
| | | | | 713/185 |
| 2007/0162961 | A1* | 7/2007 | Tarrance | G06F 21/33 |
| | | | | 726/5 |
| 2013/0333010 | A1* | 12/2013 | Chougle | G06F 21/46 |
| | | | | 726/7 |
| 2017/0161490 | A1* | 6/2017 | Fedor | G06F 21/31 |
| 2018/0234464 | A1* | 8/2018 | Sim | H04L 9/3213 |
| 2020/0287793 | A1* | 9/2020 | Buck | H04L 41/0806 |
| 2020/0322358 | A1* | 10/2020 | Farrell | H04W 12/122 |
| 2020/0387624 | A1* | 12/2020 | Dunjic | G06F 21/552 |
| 2021/0288804 | A1* | 9/2021 | Kassner | H04L 9/3271 |
| 2021/0352097 | A1* | 11/2021 | Vlahovic | G06Q 30/0185 |
| 2021/0377217 | A1* | 12/2021 | Antoche Albisor | |
| | | | | H04L 63/1433 |

* cited by examiner

*Primary Examiner* — Ali S Abyaneh
(74) *Attorney, Agent, or Firm* — Lathrop GPM LLP

(57) ABSTRACT

A method is provided for authenticating a user. A request to access a resource is received from a user agent. A cookie associated with the request is identified. The cookie includes a first subset of data that was previously used to authenticate the user. The cookie is validated based on the first subset of the data. Responsive to validating the cookie, a second subset of the data is retrieved from server-side storage. A risk decision is generated based on the first subset and the second subset. When the risk decision meets a threshold, the user is authenticated without presenting an authentication challenge, and access to the resources permitted.

4 Claims, 6 Drawing Sheets

| Property | | Description |
|---|---|---|
| Risk | Type | Auxiliary server identifiers - A, B, C, .. |
| | Score | Boolean, numeric, ENUM |
| Binding | IP Address | |
| | User-Agent | |
| | Header Names | List of header names that are attached to every HTTP request from this browser (or hash of this list) |
| | Header Values | List of header values that are consistent in every HTTP request from this browser (or hash of this list) |
| Account | User/Account ID | |
| Time | Timestamp | login event |
| Challenge | Type | A, B, C |
| | Presented? | Boolean |
| | Passed? | Boolean |

*FIG. 2*

| Property | | Description |
|---|---|---|
| Risk | Per risk type, maximal score seen | Auxiliary server identifiers- A, B, C,... |
| | Per risk type, number of risk scores provided | Boolean, numeric, ENUM |
| | Per risk type & risk score, last time this score was seen | label (in case of ENUM score) Bin (in case of numeric score) |
| Binding | IP Address | Same as all IP addresses (plus number of hits) |
| | User-Agent | Same as IP |
| | Header Names | Same as IP |
| | Header Values | Same as IP |
| Account | User/Account ID | Same as IP |
| Time | Time | |
| Challenge | Time | challenge identifiers- MFA, CAPTCHA, A,B,C |
| | Count | Boolean, numeric, ENUM |

*FIG. 3*

WEB-AUTHORIZATION USING ENHANCED COOKIE

BACKGROUND

In order to reduce fraud, server-side validation processes are often run when users attempt to perform online transactions, such as accessing user accounts. In many cases, these validation processes are expensive in time, client computational resources, and server computational resources.

Third-party services providing risk analysis are often consulted as part of the validation process. While third party services may enhance security, this additional security often comes with a hefty financial cost to the service provider. Moreover, if the third-party service becomes unavailable, for example due to service interruptions or client-side blocking, the normal validation process may break. Service providers are then forced to make hard decisions regarding account authorization—either give away access without the authorization process or take alternative more aggressive measures that increase customer friction.

SUMMARY

In general, in one aspect, one or more embodiments relate to a method for authenticating a user. The method includes receiving, from a user agent, a request to access a resource. The method also includes identifying a cookie associated with the request. The cookie includes a first subset of data that was previously used to authenticate the user. The method additionally includes validating the cookie based on the first subset of the data and retrieving a second subset of the data from server-side storage in response to validating the cookie. The method further includes generating a risk decision based on the first subset and the second subset. The method also includes authenticating the user without presenting an authentication challenge in response to the risk decision meeting a threshold. The method additionally includes permitting access to the resource.

In general, in one aspect, one or more embodiments relate to a method for authenticating a user. The method includes receiving, from a user agent, a first request to access a resource. The method also includes requesting a risk assessment from one or more risk services, and receiving a response from the one or more risk services. The method additionally includes generating a risk decision based on the response, and authenticating the user to access the resource in response to the risk decision meeting a threshold. The method further includes generating a cookie that contains a first subset of data used in making the risk decision and sending the cookie to the user agent. The method also includes storing a second subset of the data in a server-side storage. The method additionally includes permitting access to the resource.

In general, in one aspect, one or more embodiments relate to a system comprising a data storage and an authentication engine. The authentication engine executes instructions stored in a system memory to perform a number of operations. The operations include receiving, from a user agent, a request to access a resource. The operations also include identifying a cookie associated with the request. The cookie includes a first subset of data that was previously used to authenticate the user. The operations additionally include validating the cookie based on the first subset of the data and retrieving a second subset of the data from server-side storage in response to validating the cookie. The operations further include generating a risk decision based on the first subset in the second subset. The operations also include authenticating the user without presenting an authentication challenge in response to the risk decision meeting a threshold. The operations further include permitting access to the resource.

Other aspects of the invention will be apparent from the following description and the appended claims.

BRIEF DESCRIPTION OF DRAWINGS

FIG. 2 depicts an example of a cookie according to one or more illustrative embodiments.

FIG. 3 depicts an example of authentication data according to one or more illustrative embodiments.

Like elements in the various figures are denoted by like reference numerals for consistency.

DETAILED DESCRIPTION

In general, embodiments of the invention provide a method and system for authenticating a user. Specifically, embodiments of the invention grant access to a resource based on snapshots of information used in a previous authentication. Once an authorization flow is executed, a secure HTTP cookie or similar token is created and sent to the user for storage. The cookie contains a snapshot of the authorization flow (or portion thereof) and possibly also previous authorization flows.

Upon the next web request from the client, the cookie is used to locate corresponding server-side historical access data. The authorization process is then run using the previous authorization flows as recorded in the client-side cookie and server-side data. For example, if data identified in the cookie and server-side historical data indicate that the user device was approved 30 minutes ago and successfully passed an MFA/CAPTCHA challenge, the authorization process may generate a decision to allow access immediately to the user device without consulting third party security services or generating additional challenges.

Figure 1:
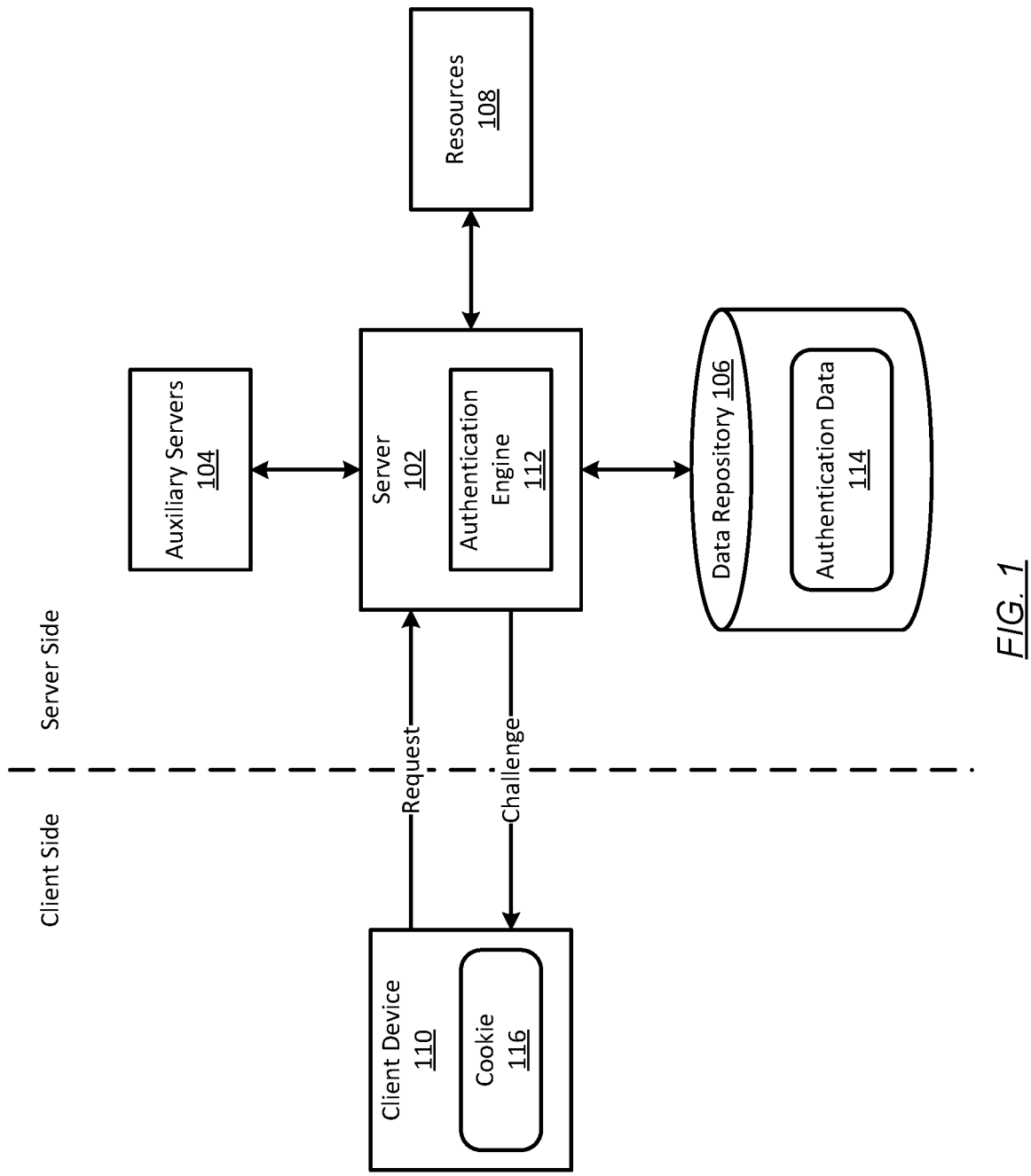
FIG. 1 shows a diagram of a system that is illustrated in accordance with one or more embodiments

Turning now to the figures, FIG. 1 shows an example data processing environment ("environment") (100) in accordance with the disclosed embodiments. In some embodiments, the environment (100) may include a server (102), one or more auxiliary servers (104), and one or more data repository (106), and one or more resources (108) communicatively coupled to the server (102) by way of a network (not shown). A client device (110) may be used or otherwise accessed by a user to access the resources (108).

Figure 8A:
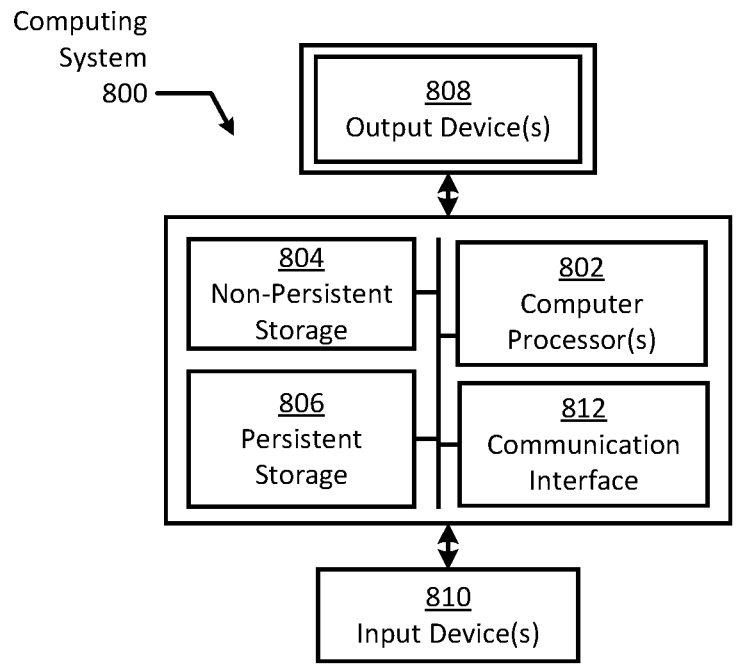
FIGS. 8A and 8B show a computing system in accordance with one or more embodiments of the invention.

Each of the server (102) and the auxiliary servers (104) is a computing system (further described in FIG. 8A). The servers may include multiple physical and virtual computing systems that form part of a cloud computing environment. In one embodiment, execution of the instructions, programs, and applications of the server is distributed to multiple physical and virtual computing systems in the cloud computing environment.

In one or more embodiments of the invention, the auxiliary servers (104) include functionality for performing risk analysis to determine the risk level and authentication requirements for accessing resources (108). The risk analysis may utilize one or more metrics to identify the risk level. The metrics may include user metrics to verify the user's identity, e.g., information about the device attempting authentication, and/or historical information gathered/saved regarding the user's and/or device's previous interactions with the system. For example, the user metrics may include the user's Internet Protocol (IP) address, device artifacts (e.g., cookies, storage objects in the cache, storage objects in the local storage device, a flash object, etc.), geolocation, number of login attempts, and any other metrics to verify the user as the account owner. For example, verifying the user's identity may require checking the IP address and cookies of the user, if any, to ensure a secure verification. Moreover, if the IP address is from a different country, the risk analysis may set the risk level to high. If the IP address was previously recorded, the risk analysis may set the risk level to low.

The risk level determined by auxiliary servers (104) is an identifier of a level of risk on a scale. For example, the scale may be from high risk to low risk. The risk level may be high risk, medium risk, low risk, or risk levels above or between high, medium, and low. By way of another example, the scale may be numeric (e.g., from one to ten) and the risk level may be a numeric value on the scale. Alternatively, the scale may be alpha or alphanumeric (e.g., from A to Z or A-1 to Z-10) and the risk level may be an alpha or alphanumeric value on the scale. In some embodiments, the server (102) can consider the risk level determined by auxiliary servers (104) when determining whether to issue a challenge.

In one or more embodiments of the invention, the resources (108) are any securable physical or virtual objects. Specifically, the resource (108) is the object to be protected so that only the appropriate individual(s) can access the resource. For example, the resource (102) may be a file, an application, a web site, a hardware device, a physical facility, a safe, a room, a physical filing cabinet, a financial account, a computer storage account, an account accessible by a kiosk, a home security system, a telephone, and/or anything else that needs to be secure and, therefore, requires user authentication. Example applications include financial software (e.g., accounting software, tax preparation software, payroll software, banking software), medical provider software, insurance claim software, home inventory software, productivity software, document management software, e-commerce software, and/or other software requiring authentication. In one embodiment, the resource (108) is a server that hosts websites and may serve structured documents (hypertext markup language (HTML) pages, extensible markup language (XML) pages, JavaScript object notation (JSON) files and messages, etc.) to interact with client device (110).

The server (102) includes an authentication engine (112). The authentication engine (112) is software executing on server (102) that includes functionality to control access to the resource (108). Specifically, the authentication engine (112) includes functionality issue challenges for presentation on the client device (110), and to receive and compare the user's response to authenticate the user. This challenge-response authentication can be implemented using a family of protocols in which one party presents a challenge (e.g., a question or an affirmative request for a specific action) and a responding party seeking to be authenticated must provide an acceptable response (e.g., a correct answer to a question) to the challenge. For example, the challenge can be a Completely Automated Public Turing test to tell Computers and Humans Apart (CAPTCHA) challenge-response, or a multifactor authentication (MFA) challenge-response. In some embodiments, the server (102) can consider the risk level determined by auxiliary servers (104) when determining whether to issue a challenge.

The server (102) may connect to one or more data repository (106). In one or more embodiments of the invention, the data repository (106) is any type of storage unit and/or device (e.g., a file system, database, data structure, or any other storage mechanism) for storing data. Further, the data repository (106) may include multiple different, potentially heterogeneous, storage units and/or devices.

The data repository (106) stores authentication data (114). Authentication data (114), also sometimes referred to herein as "historical authentication data," is data generated by one or more of server (102) and auxiliary servers (104) in response to a request from client device (110) to access resources (108). For example, the authentication data (114) may include risk information, such as risk levels determined by auxiliary servers (104) in one or more previous access attempts, the number of times that the user attempted access to the particular resource and whether those attempts were successful. The authentication data (114) may include binding and/or account information such as an Internet Protocol (IP) address, the user agent identifier, a list of header names and values included in HTTTP requests, usernames and/or account identifiers. The authentication data (114) may include challenge information, such as a challenge type (e.g., CAPTCHA, MFA, etc.), the number of times that the different challenges were presented, and whether the challenges were successfully passed.

The client device (110) can be any variety of electronic devices capable of consuming, providing, and/or rendering data communicated across a network. For example, the client device (110) can include one or more computer systems similar to that of the computer system (800) described below with regard to at least FIG. 8.

The client device (110) can include one or more applications that can be used to request content, to provide content, to render content, and/or to send and/or receive requests to and/or from other devices via the network. For example, a client device (110) may include an Internet browser application, a web services application, or a web conferencing client application. These applications may facilitate communication with servers (102), resources (108), and/or other client devices.

The client device (110) stores cookie (116). The cookie (116) is a secure HTTP cookie that allows the authentication engine (112) to track and save information about client device (110) and/or any requests, risk assessments, and challenges from a prior session with the client device (110). For example, the cookie (116) may include risk information, such as risk levels determined by auxiliary servers (104) in one or more previous access attempts, the number of times that the user attempted access to the particular resource and whether those attempts were successful. The authentication data (114) may include binding and slash or account information such as an Internet Protocol (IP) address, the user agent identifier, a list of header names and values included in HTTTP requests, usernames and/or account identifiers. The authentication data (114) may include challenge information, such as a time when the challenge was presented, and a number of times that a challenge was presented.

FIG. 2 depicts an example of a cookie (200) according to one or more illustrative embodiments. The cookie (200) of FIG. 2 is a collection of metadata that describes challenge and/or authentication related information for a request to access a resource, such as from client device (110) of FIG. 1. FIG. 2 shows the properties that are included in the cookie. Each row of FIG. 2 is for a particular property. For example, the first and second columns provide categorical and property identifiers of a property, and the third column provides a description and/or data type of the property. Taken together, the property values in the cookie (200) can be used to identify corresponding authentication data (114), and, in combination with the authentication data (114), to determine whether a challenge should be generated and presented to the client device.

The cookie (200) of FIG. 2 is an example of a cookie that can be generated when access is granted to resources, such as resources (108) of FIG. 1. In one or more embodiments, the cookie is a text (TXT) or JAVASCRIPT Object Notation (JSON) object that is generated when access is granted to the resource. Subsequent access requests may make use of the information in the cookie (200) when determining whether a challenge should be presented.

FIG. 3 depicts an example of authentication data (300) for according to one or more illustrative embodiments. The authentication data (300) of FIG. 3 is a collection of metadata that describes challenge and/or authentication related information for prior requests to access a resource, such as from client device (110) of FIG. 1. FIG. 3 shows the properties that are included in the authentication data. Each row of FIG. 3 is for a particular property. For example, the first and second columns provide categorical and property identifiers of a property, and the third column provides a description and/or data type of the property. Taken together, the property values in authentication data (300) can be used by an authentication engine, in combination with the cookie (116), to determine whether a challenge should be generated and presented to the client device.

The specification (300) of FIG. 3 is used to generate authentication data when access is granted to resources, such as resources (108) of FIG. 1. In one or more embodiments, the authentication is generated when access is granted to the resource, and stored in a database table associated with a user's account. Subsequent access requests may make use of the information in authentication data (300) when determining whether a challenge should be presented.

Figure 4:
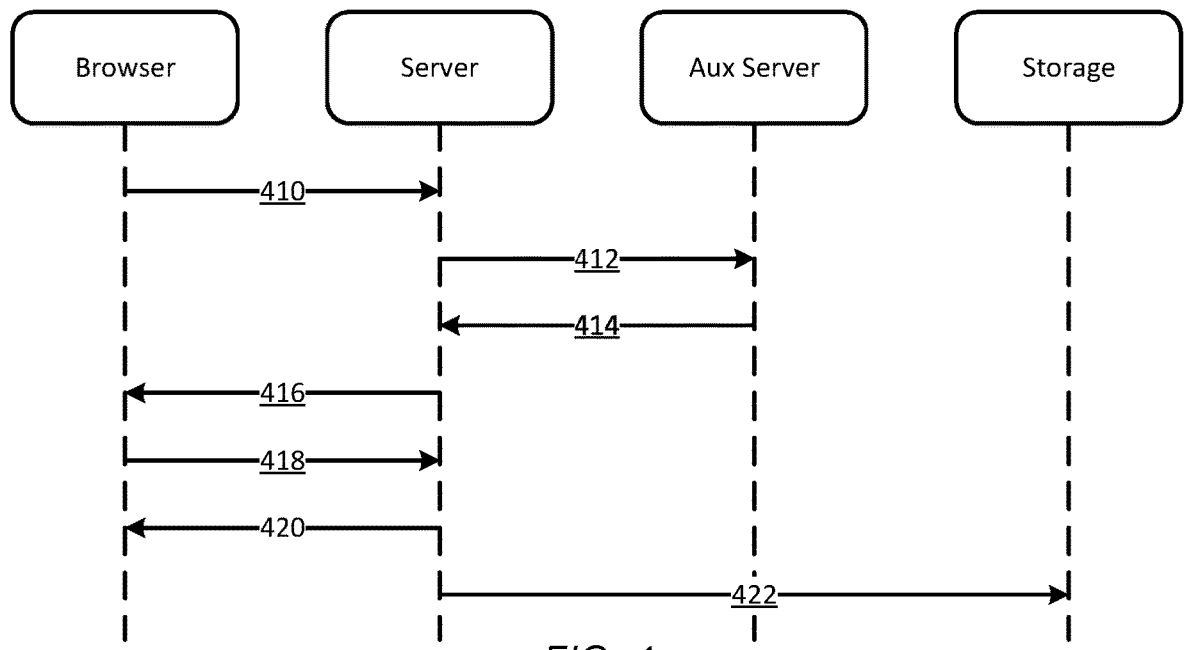
FIG. 4 shows a data flow diagram for providing access to a resource in accordance with one or more embodiments.

Referring now to FIG. 4, a data flow diagram is illustrated for providing access to a resource. The data flow of FIG. 4 illustrates an initial sign-on from a user.

User agents, such as browser executing on a client device, may attempt to sign-up or sign-in to the system and request services (410). For example, a user agent may submit login credentials, such as a username and/or password, to a server (102).

Ancillary to the sign-in process, the server may request (412) a risk assessment from one or more auxiliary servers. The risk assessment may determine a risk level using or more metrics, for example, attributes of the user's given context (i.e., previously recorded user behavior) (e.g., device used, IP address, geolocation, device identifiers from previous interactions with system, date/time), information about the device attempting authentication, and/or historical information gathers/saved regarding the user's and/or device's previous interactions with the system.

Based on the metrics, the auxiliary servers determine a risk level associated with the authentication request and return the risk level to the authentication server in a response (414). For example, the auxiliary servers may use machine learning models to determine a risk level for the access request. Taking the metrics as input, the machine learning model may perform a classification and/or regression analysis to determine the quantized level of risk.

After receiving the response from the auxiliary server, the authentication server may authenticate the user based on the risk level that was determined. Further, depending on the risk level determined by the auxiliary servers, the user may be required to respond to one or more challenges (CAPTCHA, multi-factor, etc.). The authentication server generates the challenge and sends the challenge (416) to the user agent for response.

Upon receiving a valid response from the user agent, the authentication server generates both a cookie and authentication data. The cookie and the authentication data each contain a subset of the data that was used in the process of authenticating the user. The cookie is sent it to the client device (420) for storage thereon. The authentication data is sent for storage in a server-side data repository (422) (e.g., data repository (106)).

Figure 5:
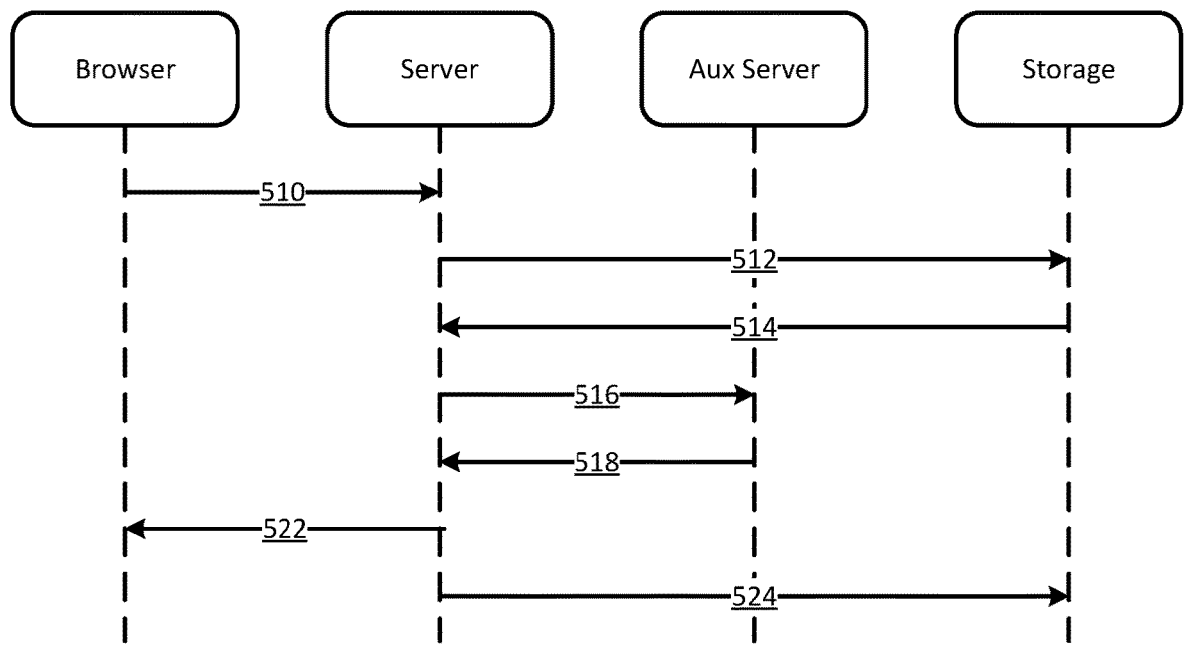
FIG. 5 shows a data flow diagram for providing access to a resource in accordance with one or more embodiments.

Referring now to FIG. 5, a data flow diagram is illustrated for providing access to a resource. The data flow of FIG. 5 illustrates a subsequent sign-on from a user.

User agents, such as browser executing on a client device, may attempt to sign-up or sign-in to the system and request services (510). In addition to the user's login credentials, the request may include a cookie from a previous session.

The authentication server unpacks the cookie, validating it against any server-side policies (timestamp expiration, access permissions, etc.). Using binding information identified in the cookie (e.g., IP address, user agent, header names and/or header values) the authentication server queries (512) the server-side storage for associated authentication data. The response (514) includes authentication data generated for a previous session of the user agent. The Authentication server ingests the cookie and the authentication data, which can be sent as context to the auxiliary servers for risk assessment (516). Based on this additional context information determined from the combined cookie and authentication data, the auxiliary servers may determine a risk level for the request that is lower than would otherwise be determined without the additional context information.

After receiving the response from the auxiliary server, the authentication server may authenticate the user based on the risk level that was determined. Further, because the risk level determined by the auxiliary servers may be lower due to the additional context information, the user may not be required to respond to one or more challenges (CAPTCHA, multi-factor, etc.). In this manner, the cookie and authentication data enhance the user experience by requiring fewer challenges to authenticate the user.

The authentication server updates the cookie and authentication data. The cookie is sent it to the client device (522) for storage thereon. The authentication data is sent for storage in a server-side data repository (422) (e.g., data repository 106).

Figure 6:
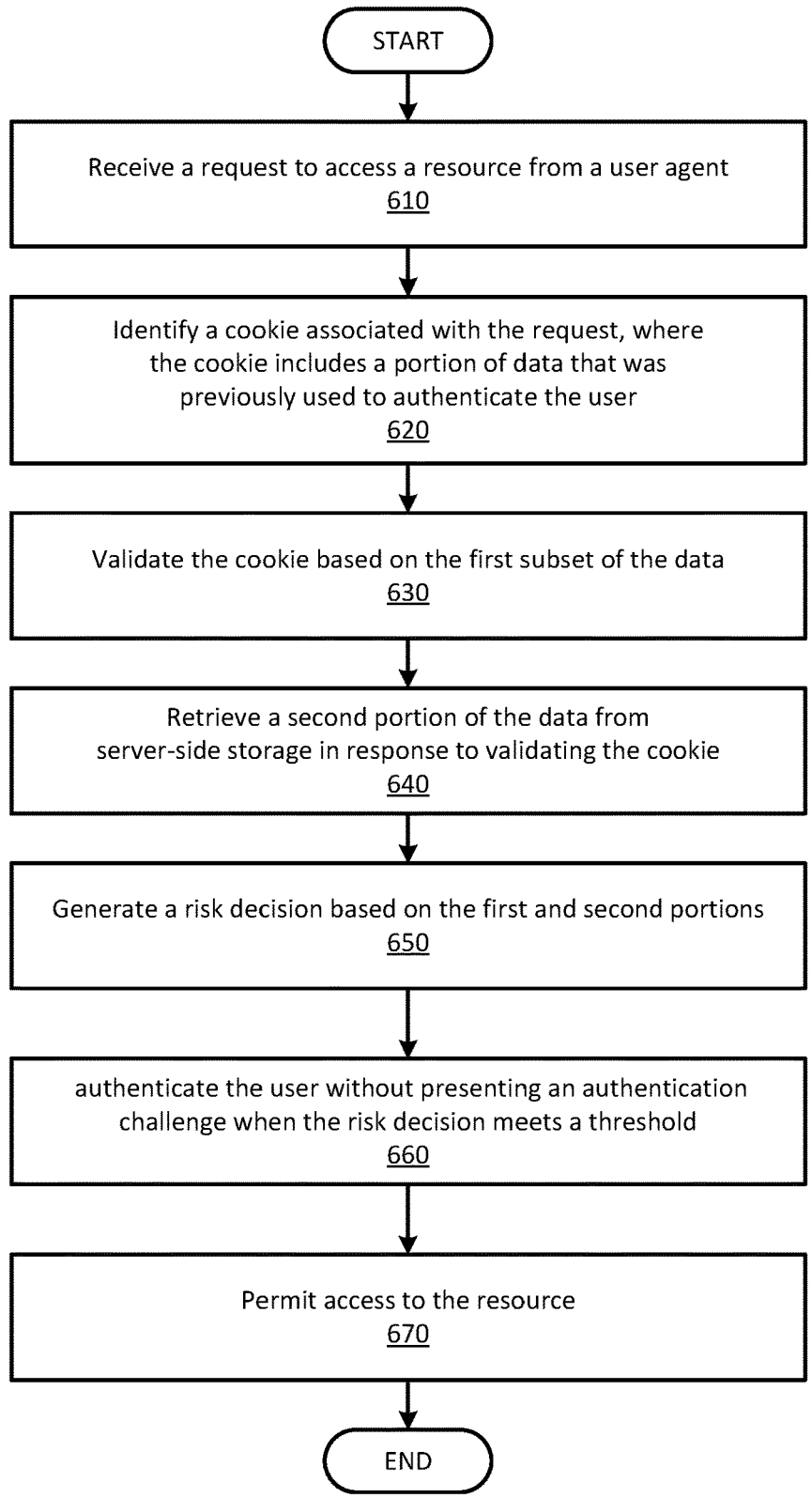
FIG. 6 shows a process for validating a user agent in accordance with one or more embodiments.

FIG. 6 shows a process for validating a user agent in accordance with one or more embodiments. The authentication procedure illustrated in FIG. 6 may be used when a user wants to log on to a previously accessed resource.

Initially, a request to access a resource is received from a user agent (step 610). In one or more embodiments of the invention, the request can include access credentials, such as a username and/or password. These access credentials are separate from the historical authentication data that is subsequently retrieved.

A cookie is identified in the request (Step 620). The cookie includes a subset of data that was used in a prior transaction to authenticate the user.

The cookie is validated based on the first subset of data (Step 630). For example, information identified in the cookie (e.g., IP address, user agent, header names and/or header values) can be compared against one or more server-side policies (timestamp expiration, access permissions, etc.) in order to determine compliance therewith.

If the cookie is determined to be valid, historical access data (i.e., a second subset of data) is retrieved from the server-side storage (Step 630). In one or more embodiments of the invention, the historical access data may be located based on data contained within the cookie (e.g., IP address, user agent, header names and/or header values). For example, the cookie may contain a serial number or MAC address (e.g., associated with the computing device), an internet protocol (IP) address, or any other identifying property or information that can reasonably be attributed to a specific user. Regardless of how the account identifier is obtained, the data repository may be accessed using the data in the cookie is binding information to the historical access data. This historical access data retrieved from the server-side storage provides additional context information that can be considered in determining a risk level for the transaction.

In one or more embodiments of the invention, the authentication server generates a risk decision based on the combined information from the cookie and the historical access data (Step 640). This historical access data Retrieve from the server-side storage provides additional context information that can be considered in determining a risk level for the transaction.

The decision may be based on a risk level determined from one or more user metrics from the combined historical access data and cookie. For example, the number or percentage of cyber-attacks instigated from the geographic region in which the user may be used to determine the risk level. In the example, the risk level is set higher when the IP address is from a geographic region identified as prone to instigating cyber-attacks. The risk level is set as low when the IP address is from a geographic region identified in the user account. For example, if the user account is a financial institution account, when the IP address indicates that the user is attempting access from a geographic region of the account owner, the risk level may be set lower.

By way of another example, the risk level may be proportionally related to how late the time of day of the access is. For example, a higher risk level may be set when the access attempt is late at night than in the middle of the day.

By way of another example, if the computing device of the user has suspicious device artifacts, then the risk level may be set as high. Similarly, the risk level may be proportional to the number of failed attempts. In other words, the greater the number of failed attempts, the higher the risk will be.

In one or more embodiments of the invention, the risk analysis may include multiple metrics. In such embodiments, the combined risk level may be the maximum, the average, or another statistically combined value for the individual risk levels. For example, if the geographic location indicates that the user is in an area prone to instigate attacks (i.e., deemed high risk), but the historical data shows that the user has made several successful accesses from the IP address (i.e., deemed low risk), the risk level may still be set as high because of the geographic region or may be set as medium as the average of the two risk levels.

By way of another example, a correlation between the multiple metrics may be considered when performing the risk analysis. For example, the risk level may be determined based on the previously recorded user behavior for accessing the resource. Specifically, the risk level is proportionally related to a degree of similarity of the current access with the previously recorded user behavior. In the example, even if an authentication attempt is done late at night, the activity may be deemed as a low risk if the previously recorded user behavior of the user indicates that access occurs at this time.

When the determined risk level meets a threshold, the authentication server may authenticate the user without presenting an authentication challenge (Step 650), thereafter permitting access to the resource (Step 660).

In one or more embodiments, the server-side authentication data is updated based on the risk decision. For example, data such as risk scores, challenge information, and timestamps in the authentication data are updated with data generated in the authentication process. An updated cookie can be generated containing similar information, and forwarded to the client for storage.

In one or more embodiments, the authentication server can request a risk analysis from one or more risk services if the cookie is not validated. Based on a machine learning analysis of the user agent (e.g., Internet Protocol (IP) address, device artifacts, geolocation, number of login attempts, etc.), the risk services make a risk assessment for their request.

When a response is received from the one or more risk services, The authentication server makes a risk decision. Without the additional context from the cookie and historical access data, the risk analysis performed using only information in the user agent's request (e.g., packet headers, device used, IP address, geolocation, device identifiers from previous interactions with system, date/time, etc.). Without this additional context information, the authentication server may determine a higher level of risk that is associated with the request.

This higher level of risk may require successful challenge response from the user before access to the resources granted. For example, if the risk decision does not meet a threshold, the authentication server may generate an authentication challenge (e.g., CAPTCHA, multifactor authentication, short messaging service, email, etc.) and present the authentication challenge to the user. Authentication of the user and subsequent access to the resource is determined, at least in part, based on the user agent's successful response to the authentication challenge.

Figure 7:
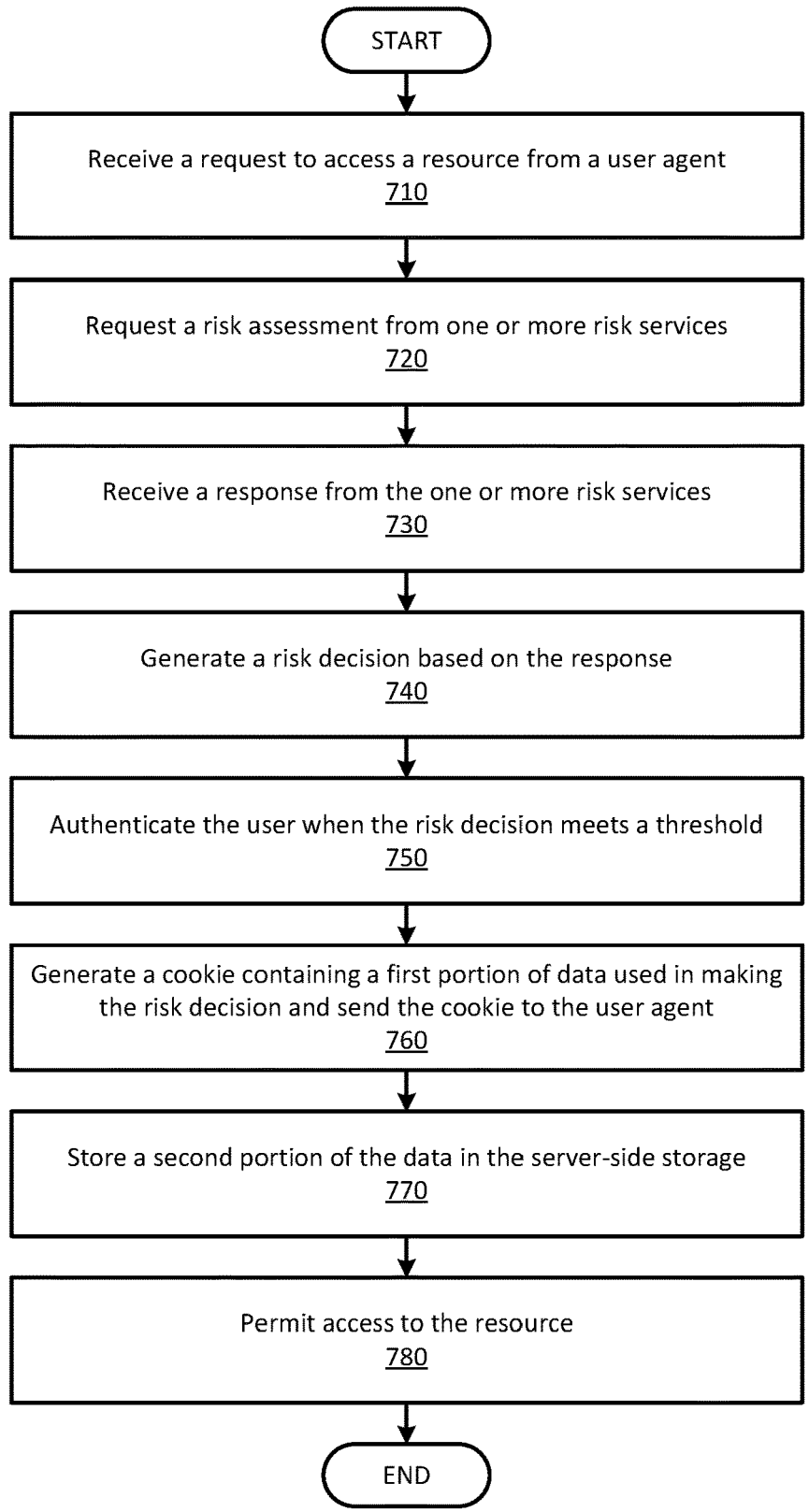
FIG. 7 shows a process for validating a user agent in accordance with one or more embodiments of the invention.

FIG. 7 shows a process for validating a user agent in accordance with one or more embodiments of the invention. The authentication procedure illustrated in FIG. 7 may be used when a user wants to log on to a previously accessed resource.

Initially, a request to access a resource is received from a user agent (Step 710). In one or more embodiments of the invention, the request can include access credentials, such as a username and/or password. These access credentials are separate from the historical authentication data that is subsequently generated.

The authentication server can request a risk analysis from one or more risk services (Step 720). In one or more embodiments, the risk services generate a risk assessment of the request based on a machine learning analysis of the user agent (e.g., Internet Protocol (IP) address, device artifacts, geolocation, number of login attempts, etc.). The risk level determined by through services maybe and identifier of a level of risk on a scale (EG, numeric, alphanumeric, enumerated, etc.)

When a response is received from the one or more risk services (Step 730), The authentication server generates a risk decision (Step 750), which can be based on various thresholds values for the risk assessments performed by the risk services. The decision may be to permit access, to deny access, or to present a challenge.

When the risk decision meets a threshold, the authentication server authorizes the user to access the resource (Step 760). A cookie containing a portion of data that was generated in the risk decision process is created and sent to the user agent (Step 770). The second portion of the generated data is stored in server-side storage as historical access data. The authentication server then permits the user agent to access the resource (Step 780).

In one or more embodiments, the cookie and historical access data can be used as additional context to determine at risk level when a subsequent access request is later received. For example, the user agent May send the cookie to the authentication server when later requesting a subsequent access to the resource. Using information identified in the cookie, i.e., a first subset of data generated in a previous authorization, the authentication server validates the cookie and retrieves a second subset of the data from server-side storage. A risk decision and then be generated a based on the combined first and second data subsets, and, when the risk decision meets a threshold, the user can be authenticated without presenting an authentication challenge.

While the various steps in the flowcharts are presented and described sequentially, at least some of the steps may be executed in different orders, may be combined, or omitted, and at least some of the steps may be executed in parallel. Furthermore, the steps may be performed actively or passively.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processors (802), non-persistent storage (804), persistent storage (806), a communication interface (812) (e.g., Bluetooth interface, infrared interface, network interface, optical interface, etc.), and numerous other elements and functionalities that implement the features and elements of the disclosure. The computer processor(s)(802) may be an integrated circuit for processing instructions. The computer processor(s) may be one or more cores or micro-cores of a processor. The computer processor(s) (802) includes one or more processors. The one or more processors may include a central processing unit (CPU), a graphics processing unit (GPU), a tensor processing unit (TPU), combinations thereof, etc.

The input devices (810) may include a touchscreen, keyboard, mouse, microphone, touchpad, electronic pen, or any other type of input device. The input devices (810) may receive inputs from a user that are responsive to data and messages presented by the output devices (808). The inputs may include text input, audio input, video input, etc., which may be processed and transmitted by the computing system (800) in accordance with the disclosure. The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the output devices (808) may include a display device, a printer, external storage, or any other output device. One or more of the output devices may be the same or different from the input device(s). The input and output device(s) may be locally or remotely connected to the computer processor(s) (802). Many different types of computing systems exist, and the aforementioned input and output device(s) may take other forms. The output devices (808) may display data and messages that are transmitted and received by the computing system (800). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 8B:
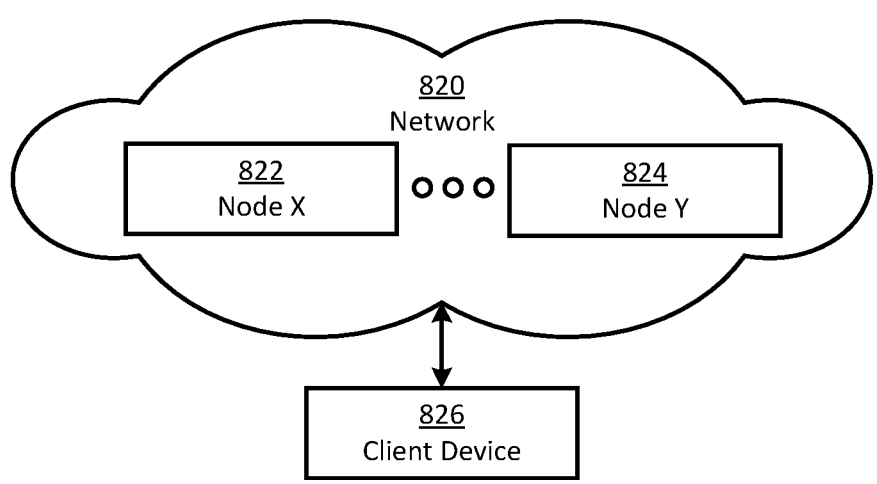

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (800) may be located at a remote location and connected to the other elements over a network.

The nodes (e.g., node X (822), node Y (824)) in the network (820) may be configured to provide services for a client device (826), including receiving requests and transmitting responses to the client device (826). For example, the nodes may be part of a cloud computing system. The client device (826) may be a computing system, such as the computing system shown in FIG. 8A. Further, the client device (826) may include and/or perform all or a portion of one or more embodiments of the invention.

The computing system of FIG. 8A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method for authenticating a user, comprising:
   receiving, from a user agent, a request to access a resource;
   receiving, from the user agent, a cookie associated with the request;
   unpacking the cookie, wherein unpacking the cookie includes retrieving from the cookie a first subset of data regarding data that was used in a previous authentication permitting the user access to the resource;
   validating the cookie based on the first subset of the data by determining that the first subset of data is in compliance with one or more server-side policies;
   retrieving, in response to validating the cookie, binding information from the cookie;
   querying a server-side storage for authentication data associated with the binding information;
   receiving a response, including the authentication data, from the server-side storage, wherein the authentication data includes a second subset of the data regarding the data that was used in the previous authentication permitting the user access to the resource;
   retrieving the second subset of data;
   generating a risk decision based on combined information of the first subset of data and the second subset of data;
   updating the cookie to include an updated first subset of data based on the first subset of data in the risk decision;
   updating the authentication data to include an updated second subset of data based on the second subset of data in the risk decision;
   determining that the risk decision does not meet a threshold;
   presenting, in response to the risk decision not meeting the threshold, an authentication challenge;
   authenticating the user based on a response to the authentication challenge;
   sending, in response to authenticating the user, the updated cookie to the user agent;
   storing, in response to authenticating the user, the authentication data in the server-side storage; and
   permitting, in response to authenticating the user, access to the resource.

2. The method of claim 1, wherein the request includes access credentials that are separate from the cookie, wherein the access credentials include a username and password.

3. A system comprising:
   a data storage; and
   a hardware processor for executing an authentication engine configured to perform a number of operations including:
   receiving, from a user agent, a request to access a resource;
   receiving, from the user agent, a cookie associated with the request;
   unpacking the cookie, wherein unpacking the cookie includes retrieving from the cookie a first subset of data regarding data that was used in a previous authentication permitting a user access to the resource;
   validating the cookie based on the first subset of the data by determining that the first subset of data is in compliance with one or more server-side policies;
   retrieving, in response to validating the cookie, binding information from the cookie;
   querying a server-side storage for authentication data associated with the binding information;
   receiving a response, including the authentication data, from the server-side storage, wherein the authentication data includes a second subset of the data regarding the data that was used in the previous authentication permitting the user access to the resource;
   retrieving the second subset of data;
   generating a risk decision based on combined information of the first subset of data and the second subset of data;
   updating the cookie to include an updated first subset of data based on the first subset of data in the risk decision;
   updating the authentication data to include an updated second subset of data based on the second subset of data in the risk decision;
   determining that the risk decision does not meet-a threshold;
   presenting, in response to the risk decision not meeting the threshold, an authentication challenge;

authenticating the user based on a response to the authentication challenge;

sending, in response to authenticating the user, the updated cookie to the user agent;

storing, in response to authenticating the user, the authentication data in the server-side storage; and permitting, in response to authenticating the user, access to the resource.

4. The system of claim 3, wherein the request includes access credentials for the user that are separate from the cookie, wherein the access credentials include a username and password.

\* \* \* \* \*